US012462856B1

(12) United States Patent
Pescovsky et al.

(10) Patent No.: US 12,462,856 B1
(45) Date of Patent: Nov. 4, 2025

(54) LOW LATENCY SYNCHRONIZATION

(71) Applicant: Amazon Technologies, Inc., Seattle, WA (US)

(72) Inventors: Ariel Pescovsky, Kfar Saba (IL); Itai Avron, Petah Tikva (IL); Roi Ben Haim, Netanya (IL)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 18/461,013

(22) Filed: Sep. 5, 2023

(51) Int. Cl.
*G11C 7/10* (2006.01)
*G11C 7/22* (2006.01)
*H03K 21/02* (2006.01)

(52) U.S. Cl.
CPC ............ *G11C 7/1093* (2013.01); *G11C 7/222* (2013.01); *H03K 21/026* (2013.01)

(58) Field of Classification Search
CPC ................................. G11C 7/1093; G11C 7/10
USPC ...................................................... 365/233.1
See application file for complete search history.

(56) References Cited

U.S. PATENT DOCUMENTS

| 7,710,801 | B2* | 5/2010 | Li | G01R 31/318594 |
| | | | | 365/201 |
| 2003/0072462 | A1* | 4/2003 | Hlibowicki | H04R 3/007 |
| | | | | 381/96 |
| 2007/0241821 | A1* | 10/2007 | Dally | H03G 3/3052 |
| | | | | 330/279 |
| 2017/0093558 | A1* | 3/2017 | Ramezani | H04L 7/0029 |
| 2020/0401407 | A1* | 12/2020 | Foss | G11C 8/10 |

* cited by examiner

*Primary Examiner* — Muna A Techane
(74) *Attorney, Agent, or Firm* — Weaver Austin Villeneuve & Sampson LLP

(57) ABSTRACT

An integrated circuit to synchronize a pulse signal from a first clock domain to a second clock domain includes a first flip-flop and a second flip-flop. The first flip-flop has a first stage input, a first clock input, and a first stage output. The first clock input is driven by a first clock signal of the first clock domain, and the first stage input is driven by a result of XOR-ing the input pulse signal and the first stage output. The second flip-flop has a second stage input, a second clock input, and a second stage output. The second clock input is driven by a second clock signal of the second clock domain, and the second stage input is driven by the first stage output. The synchronized output pulse signal is generated by XOR-ing the second stage output with the first stage output.

22 Claims, 7 Drawing Sheets

LOW LATENCY SYNCHRONIZATION

BACKGROUND

Integrated circuit (IC) devices can have components with interfaces that operate at different frequencies. For example, some components may use a bus interface protocol operating at a certain frequency while other components may use an interconnect protocol operating at a different frequency. When such components communicate with each other, the signals carrying the communication may have to cross from one clock domain to another.

BRIEF DESCRIPTION OF THE DRAWINGS

Various embodiments in accordance with the present disclosure will be described with reference to the drawings, in which.

DETAILED DESCRIPTION

Figure 1:
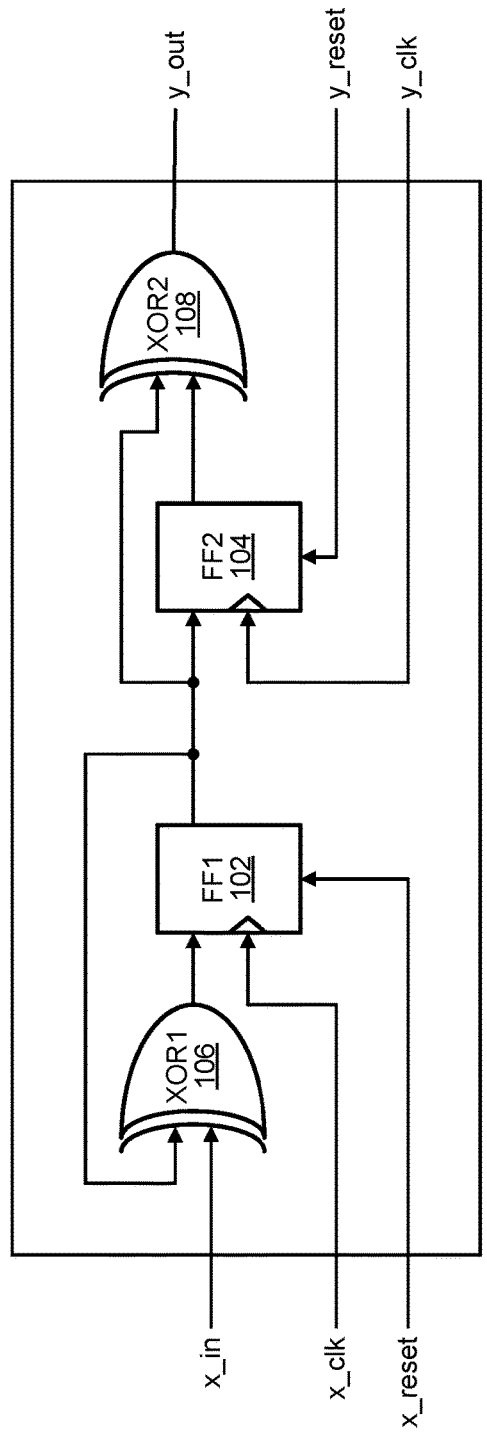
FIG. 1 illustrates a block diagram of an example of an integrated circuit, according to certain aspects of the disclosure.

A signal generated in a source clock domain operating at a source clock frequency can cross into a target clock domain operating at a target clock frequency by passing the signal through a synchronizer circuit. To avoid metastability issues, a synchronizer circuit may include a series of two or more flip-flop stages operating at the target clock frequency. However, such a synchronizer circuit may introduce a total latency of one source clock cycle plus at least two target clock cycles into the signal path.

The techniques disclosed herein can be used to reduce the latency of a synchronizer circuit to just one source clock cycle when passing a signal from a source clock domain to a target clock domain. The synchronizer circuit can be implemented using a first stage flip-flop clocked by the source clock of the source clock domain, coupled in series with a second stage flip-flop clocked by the target clock of the target clock domain. The input of the first stage flip-flop is driven by a result of XOR-ing the input signal being synchronized and the output of the first stage flip-flop. The input of the second stage flip-flop is driven by the output of the first stage flip-flop. The output signal of the synchronizer circuit (the synchronized pulse signal) is generated by XOR-ing the output of the first stage flip-flop with the output of the second stage flip-flop. A synchronizer circuit implemented in such a manner can be used, for example, in applications in which the source clock and the target clock are derived from the same source (e.g., from same phase-locked loop (PLL)) such that the slower clock is edge-aligned with the faster clock. Such a synchronizer circuit also allows the frequency of the source or target clock to be changed dynamically or on-the-fly without affecting the operation of the synchronizer circuit.

By way of example, the synchronizer circuit implemented according to the techniques disclosed herein can be used with a first-in-first-out (FIFO) memory that is written in a write clock domain and read in a read clock domain. A first synchronizer circuit can synchronize a write enable signal from the write clock domain into the read clock domain, such that the synchronized write enable signal can be used to determine a FIFO empty status on the read side. A second synchronizer circuit can synchronize a read enable signal from the read clock domain into the write clock domain, such that the synchronized read enable signal can be used to determine a FIFO full status on the write side. This allows the FIFO empty status and the FIFO full status to be determined with minimal delay to keep the read and write pointers in synch. This also reduces the latency of reading the data out from the FIFO. Given the up-to-date FIFO statuses, the data can be read directly from the FIFO entry as soon as the entry has been written.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a block diagram of an example of an integrated circuit 100. Integrated circuit 100 is an example of a synchronizer circuit that can be implemented in an integrated circuit device with components that operate at different frequencies. For instance, integrated circuit 100 can be used to provide low latency synchronization in a FIFO memory having different write and read clock frequencies.

Integrated circuit 100 has an input x_in operable to receive an input signal from a first clock domain operating with a first clock signal x_clk, and an output y_out operable to provide an output signal in a second clock domain operating with a second clock signal y_clk. The first clock can be referred to as a source clock, and the second clock can be referred to as a target clock. Integrated circuit 100 may include a first flip-flop FF1 102 coupled in series with a second flip-flop FF2 104. The first flip-flop FF1 102 can be referred to as a first stage flip-flop, and the second flip-flop FF2 104 can be referred to as a second stage flip-flop.

The first flip-flop FF1 102 has a first stage input, a first clock input, a first stage output, and a first reset input. The first clock input of flip-flop FF1 102 is driven by the first clock signal x_clk of the first clock domain, and the first stage input of flip-flop FF1 102 is driven by a result of XOR-ing the input signal x_in and the first stage output of the first flip-flop FF1 102. The XOR operation can be implemented, for example, using a XOR gate XOR1 106, or other equivalent logic gates. The input signal x_in can be, for example, a pulse signal that is generated in the first clock domain and being synchronized to the second clock domain. The first reset input of flip-flop FF1 102 is driven by a reset signal x_reset in the first clock domain.

The second flip-flop FF2 104 has a second stage input, a second clock input, a second stage output, and a second reset input. The second clock input of flip-flop FF2 104 is driven by the second clock signal y_clk of the second clock domain, and the second stage input of flip-flop FF2 104 is driven by the first stage output of the first flip-flop 102. The second reset input of flip-flop FF2 104 is driven by a reset signal y_reset in the second clock domain. The output signal y_out is generated by XOR-ing the second stage output of the second flip-flop FF2 104 with the first stage output of the first flip-flop FF1 102. The XOR operation can be implemented, for example, using a XOR gate XOR2 108, or other equivalent logic gates. The output signal y_out can be, for example, a synchronized pulse in the second clock domain.

Figure 7:
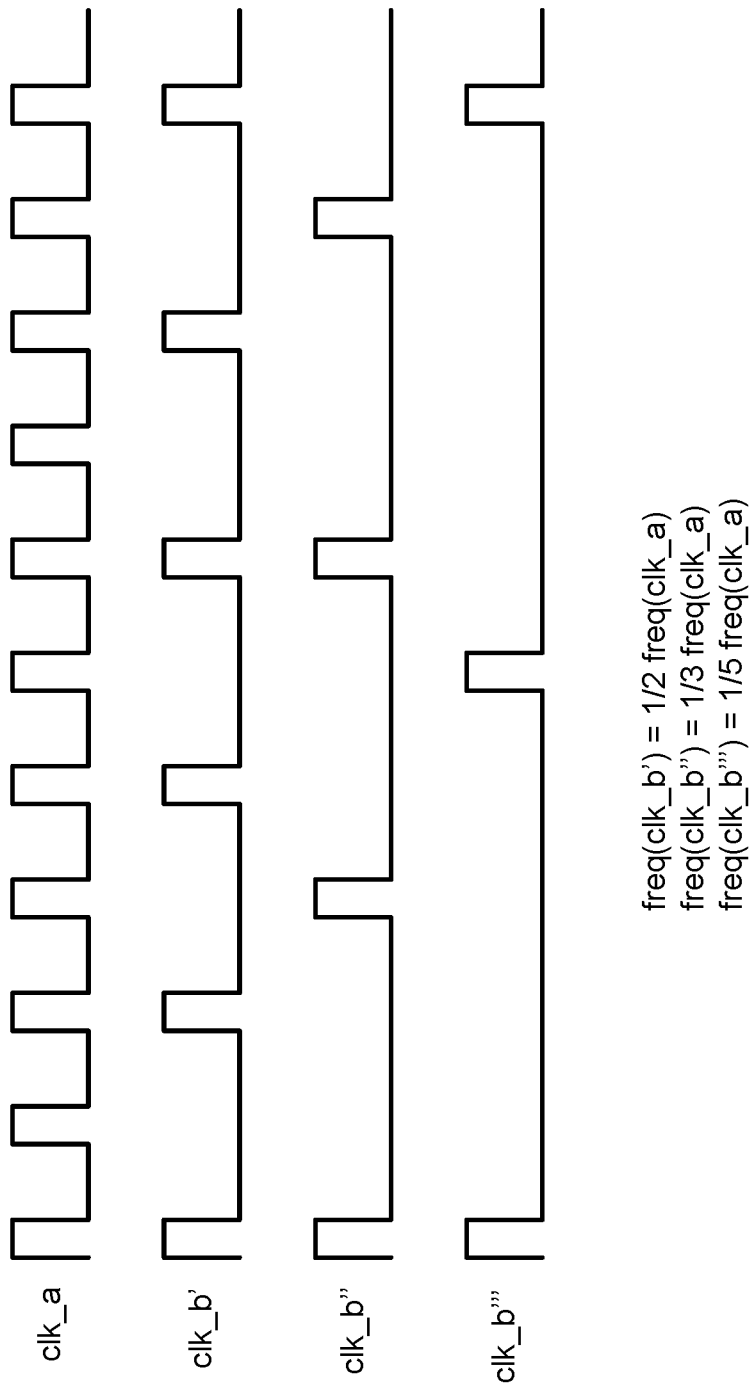
FIG. 7 illustrates examples of a slow clock derived from a fast clock using a clock-gate divider.

Integrated circuit 100 can be used, for example, in applications where the first clock signal x_clk has a frequency that is obtained by applying a scaling factor to the frequency of the second clock signal y_clk, or vice versa. In some implementations, both clock signals can be derived from the same clock source (e.g., same PLL) such that the slower clock is edge aligned with the faster clock. The first clock signal x_clk can have a frequency that is higher than the frequency of the second clock signal y_clk, or the second clock signal y_clk can have a frequency that is higher than the frequency of the first clock signal x_clk. Hence, the scaling factor can be $2^N$ or $1/2^N$, where N is an integer. The scaling factor between the two clock frequencies can also be changed on-the-fly and is dynamically adjustable without interrupting the operation of integrated circuit 100. The slower clock can also be derived from the faster clock using a clock-gate divider that generates an output clock by removing clock pulses from the source clock without changing the clock pulse width. Using a clock-gate divider can maintain the edge alignment of the two clocks irrespective of the scaling factor, and thus any scaling factor can be achieved. FIG. 7 illustrates examples of a slower clk_b generated from a faster clk_a using a clock-gate divider.

Integrated circuit 100 can generate the output signal y_out from the input signal x_in with just one source clock cycle latency (one clock cycle of x_clk). This cuts down the latency of other synchronizer circuits by at least two clock cycles of the target clock. The operation of integrated circuit 100 will be further explained using the timing diagrams of FIGS. 2-3.

Figure 2:
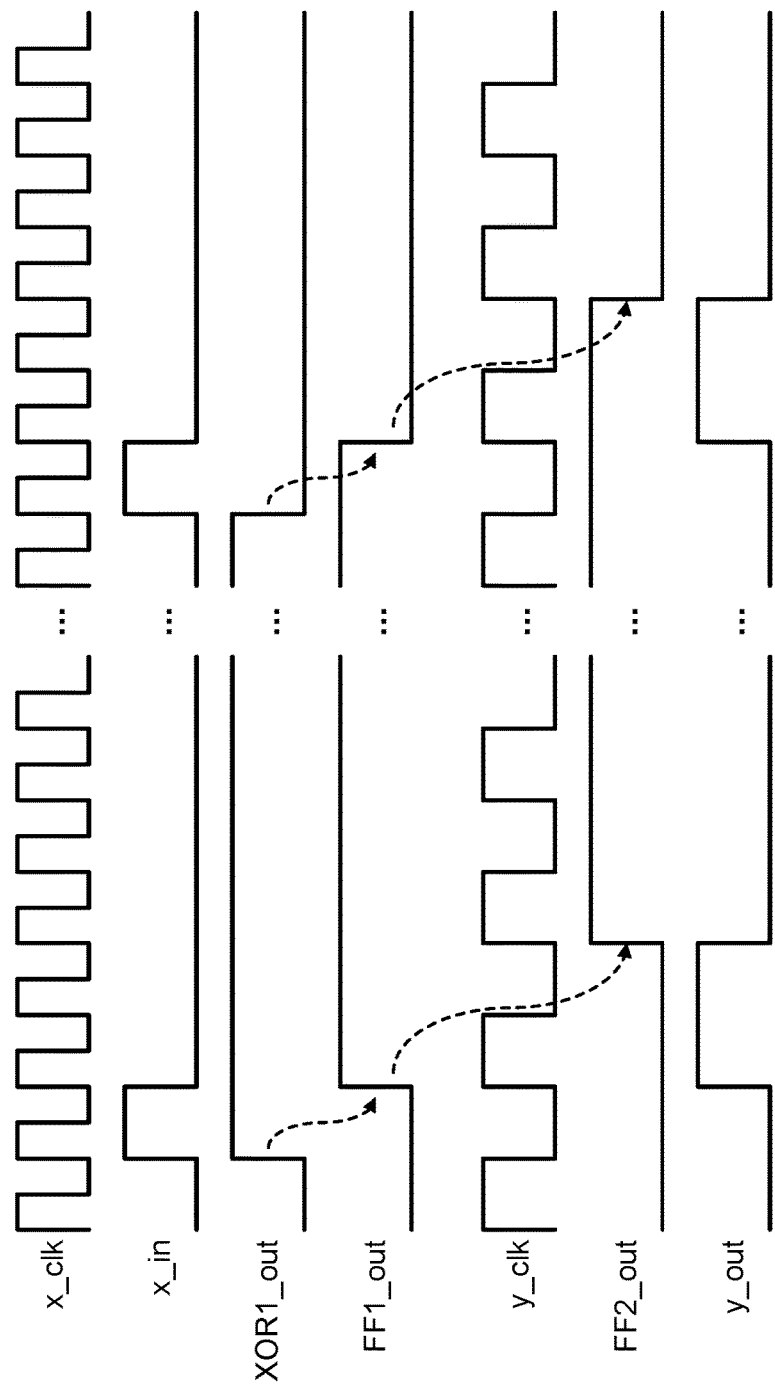
FIG. 2 illustrates a timing diagram of an example operation of an integrated circuit, according to certain aspects of the disclosure.

FIG. 2 illustrates an example of a timing diagram 200 showing the operation of integrated circuit 100. The signal x_clk is the source clock in the source clock domain, x_in is the input pulse signal being synchronized, XOR1_out is the output of XOR gate XOR1 106, FF1_out is the output of flip-flop FF1 102, y_clk is the target clock in the target clock domain, and FF2_out is the output of flip-flop FF2 104. The signal y_out is the output of XOR gate XOR2 108 and is the output pulse signal synchronized to the target clock domain. Timing diagram 200 shows an example of operating integrated circuit 100 with the frequency of the source clock x_clk being faster than the target clock y_clk. In particular, the source clock x_clk is operating at twice the frequency of the target clock y_clk, and thus the scaling factor to obtain the source clock x_clk from the target clock y_clk in this specific example is 2.

Referring to FIG. 2, the initial states of the input signal x_in and the output signal FF1_out of the first stage flip-flop FF1 102 are at a logic 0. Hence, the initial state of the output signal XOR1_out of XOR gate 106 is also at a logic 0. Similarly, the initial state of the output signal of the second stage flip-flop FF2 104 and the output signa y_out are at a logic 0. When a pulse is applied to input signal x_in, the change of logic state from a logic 0 to a logic 1 on x_in causes XOR1_out to toggle from a logic 0 to a logic 1. Since XOR1_out is applied to the input of flip-flop FF1 102, the output signal FF1_out of flip-flop FF1 102 will transition from a logic 0 to a logic 1 after one clock cycle of x_clk.

The signal FF1_out outputted from flip-flop FF1 102 is applied as the input to flip-flop FF2 104, which is clocked by y_clk. Hence, the output signal FF2_out of flip-flop 104 will transition from a logic 0 to a logic 1 after one clock cycle of y_clk. The output signal y_out is generated from the XOR of FF1_out and FF2_out. Because FF1_out transitions one clock cycle of y_clk before FF2_out, a single cycle pulse in the y_clk domain is generated on y_out at the rising edge of FF1_out. When FF2_out transitions from a logic 0 to a logic 1 following FF1_out, the output signal y_out will transition back to a logic 0 as a result of the XOR operation. As can be seen, the pulse on the output signal y_out is generated in the y_clk domain with a latency of one clock cycle of x_clk from the x_in pulse signal.

The logic states of XOR1_out, FF1_out, and FF2_out will remain at a logic 1 until the next pulse is applied to the input signal x_in. At the rising edge of the next input pulse on x_in, the logic state of XOR1_out will toggle from a logic 1 back to a logic 0 as a result of the XOR operation on x_in and FF1_out. Since XOR1_out is applied to the input of flip-flop FF1 102, the output signal FF1_out of flip-flop FF1 102 will transition from a logic 1 to a logic 0 after one clock cycle of x_clk.

Consequently, the output signal FF2_out of flip-flop 104 will transition from a logic 1 to a logic 0 after one clock cycle of y_clk. The output signal y_out is generated from the XOR of FF1_out and FF2_out. Because FF1_out transitions one clock cycle of y_clk before FF1_out, a single cycle pulse in the y_clk domain is generated on y_out at the falling edge of FF1_out. When FF2_out transitions from a logic 1 to a logic 0 following FF1_out, the output signal y_out will transition back to a logic 0 as a result of the XOR operation. In this manner, integrated circuit 100 can synchronize an input pulse from the x_clk domain to the y_clk domain with a single cycle latency of x_clk.

Figure 3:
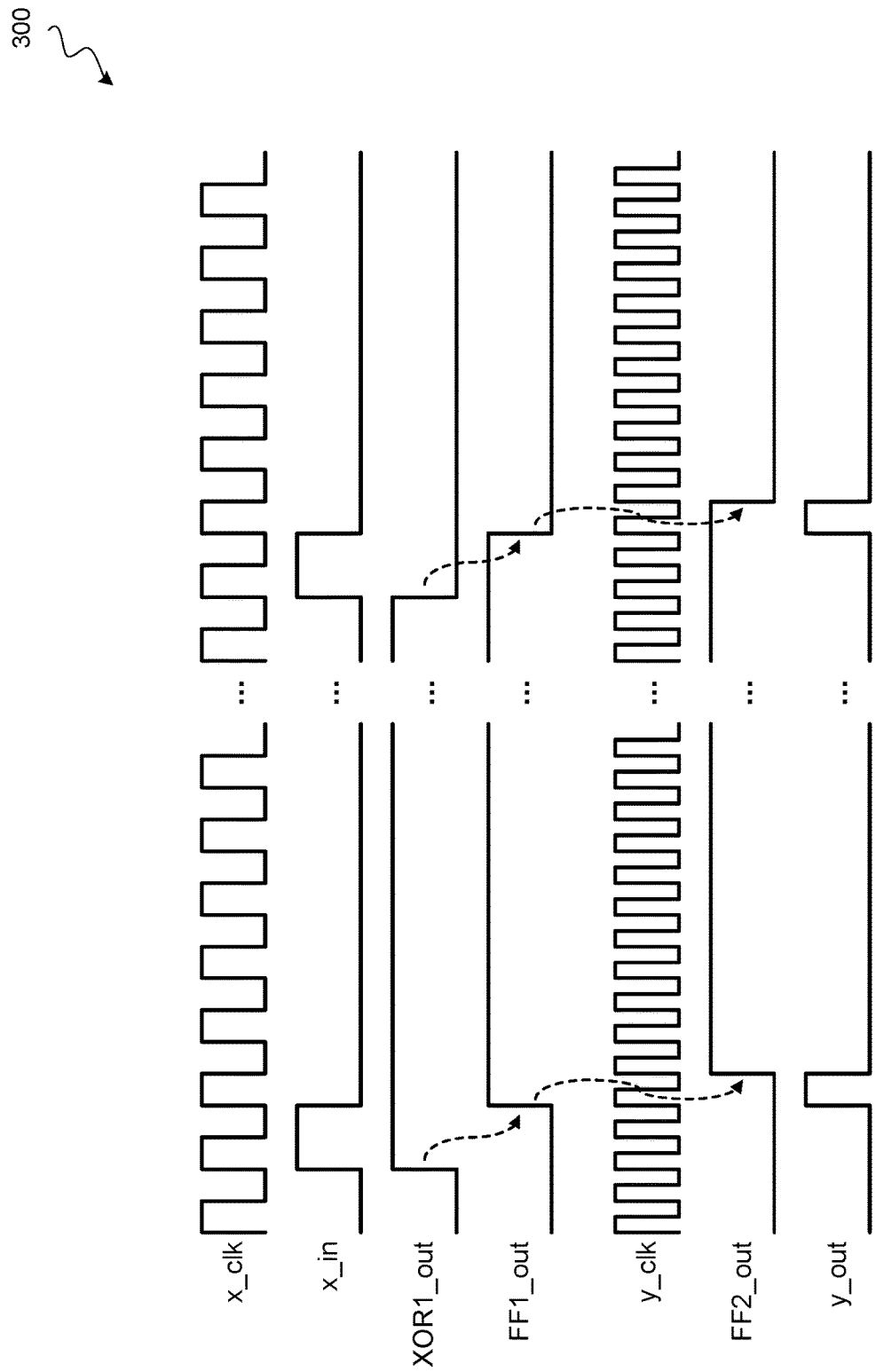
FIG. 3 illustrates a timing diagram of another example operation of an integrated circuit, according to certain aspects of the disclosure.

FIG. 3 illustrates an example of a timing diagram 300 showing another operation of integrated circuit 100. The signal labels are the same as those shown in timing diagram 200. Timing diagram 300 shows an example of operating integrated circuit 100 with the frequency of the source clock x_clk being slower than the target clock y_clk. In particular, the source clock x_clk is operating at half the frequency of the target clock y_clk, and thus the scaling factor to obtain the source clock x_clk from the target clock y_clk in this specific example is 1/2.

Referring to FIG. 3, similar to timing diagram 200, the initial states of the input signal x_in and the output signal FF1_out of the first stage flip-flop FF1 102 are at a logic 0. Hence, the initial state of the output signal XOR1_out of XOR gate 106 is also at a logic 0. The initial state of the output signal of the second stage flip-flop FF2 104 and the output signa y_out are also at a logic 0. When a pulse is applied to input signal x_in, the change of logic state from a logic 0 to a logic 1 on x_in causes XOR1_out to toggle from a logic 0 to a logic 1. Since XOR1_out is applied to the input of flip-flop FF1 102, the output signal FF1_out of flip-flop FF1 102 will transition from a logic 0 to a logic 1 after one clock cycle of x_clk.

The signal FF1_out outputted from flip-flop FF1 102 is applied as the input to flip-flop FF2 104, which is clocked by y_clk. Hence, the output signal FF2_out of flip-flop 104 will transition from a logic 0 to a logic 1 after one clock cycle of y_clk. The output signal y_out is generated from the XOR of FF1_out and FF2_out. Because FF1_out transitions one clock cycle of y_clk before FF2_out, a single cycle pulse in the y_clk domain is generated on y_out at the rising edge of FF1_out. When FF2_out transitions from a logic 0 to a logic 1 following FF1_out, the output signal y_out will transition back to a logic 0 as a result of the XOR operation. As can be seen, the pulse on the output signal y_out is generated in the y_clk domain with a latency of one clock cycle of x_clk from the x_in pulse signal.

The logic states of XOR1_out, FF1_out, and FF2_out will remain at a logic 1 until the next pulse is applied to the input signal x_in. At the rising edge of the next input pulse on x_in, the logic state of XOR1_out will toggle from a logic 1 back to a logic 0 as a result of the XOR operation on x_in and FF1_out. Since XOR1_out is applied to the input of flip-flop FF1 102, the output signal FF1_out of flip-flop FF1 102 will transition from a logic 1 to a logic 0 after one clock cycle of x_clk.

Consequently, the output signal FF2_out of flip-flop 104 will transition from a logic 1 to a logic 0 after one clock cycle of y_clk. The output signal y_out is generated from the XOR of FF1_out and FF2_out. Because FF1_out transitions one clock cycle of y_clk before FF1_out, a single cycle pulse in the y_clk domain is generated on y_out at the falling edge of FF1_out. When FF2_out transitions from a logic 1 to a logic 0 following FF1_out, the output signal y_out will transition back to a logic 0 as a result of the XOR operation. In this manner, integrated circuit 100 can synchronize an input pulse from the x_clk domain to the y_clk domain with a single cycle latency of x_clk. The same latency of one clock cycle of x_clk is achieved regardless of whether y_clk is faster than x_clk, or vice versa. The scaling facto between the two clocks can also be changed on-the-fly without interrupting the operation of integrate circuit 100.

Figure 4:
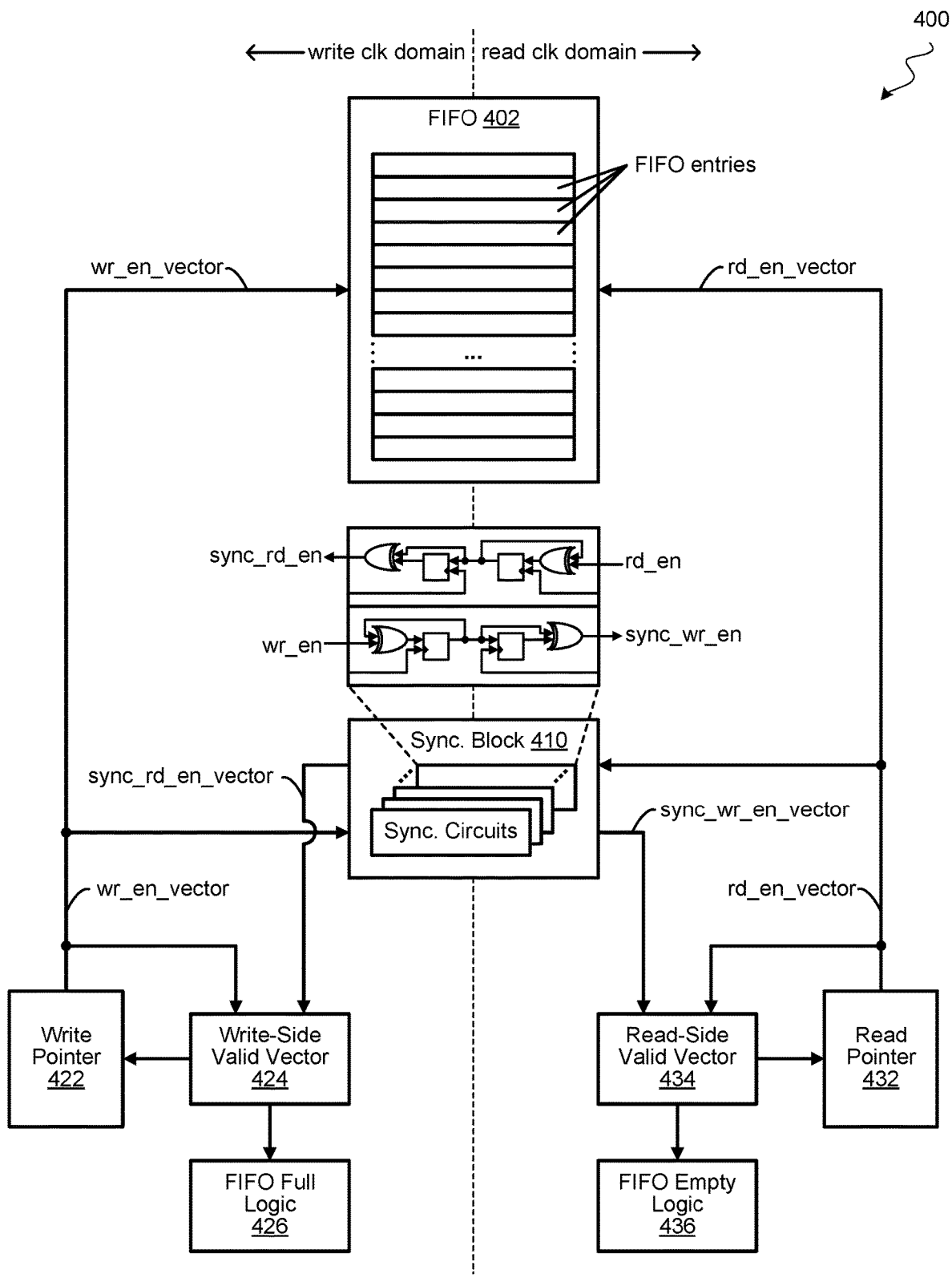
FIG. 4 illustrates a simplified block diagram of an example of an integrated circuit device, according to certain aspects of the disclosure.

FIG. 4 illustrates a simplified block diagram of a portion of an integrated circuit device 400. Integrated circuit device 400 can be, for example, an application-specific integrated circuit (ASIC) device, a system-on-chip (SoC), or other types of integrated circuit device. Integrated circuit device 400 includes a first-in-first-out (FIFO) memory 402 having multiple FIFO entries that are written in order and read out in the same order. FIFO memory 402 can be implemented, for example, using registers or memories such as SRAM. FIFO memory 402 can be written in a write clock domain and read in a read clock domain. This may occur, for example, when the component writing FIFO memory 402 (referred to as the FIFO writer) is a different component than the component reading FIFO memory 402 (referred to as the FIFO reader). In some implementations, the write clock signal and the read clock signal can be based on the same clock source.

The write clock signal in the write clock domain can operate at a different frequency than the read clock signal in the read clock domain. For example, the frequencies of the two clock signals can be obtained by applying a scaling factor to the frequency of one clock to derive the frequency of the other clock. In some implementations, the scaling factor can be dynamically adjusted or modified on-the-fly during operation. For example, certain bus interface or interconnect protocols such as peripheral component interconnect express (PCI-e) may allow dynamic frequency adjustments. Hence, FIFO memory 402 can be implemented to support changing the frequency of the write clock domain and/or the read clock domain on-the-fly to adhere to the bus interface or interconnect protocols.

To keep track of the next available FIFO entry to write, integrated circuit device 400 may include a write pointer generator 422 operating in the write clock domain. Write pointer generator 422 can generate the write pointer by starting with an initial value that points to the initial FIFO entry. The write pointer can be incremented to point to the next available FIFO entry for each write transaction issued by the FIFO writer, so long as the FIFO is not full. Write pointer generator 422 can rollover the write pointer back to the initial FIFO entry when incrementing the write pointer from the last FIFO entry. In some implementations, the write pointer generator 422 can generate a one-hot write enable vector (wr_en_vector) based on the write pointer. The write enable vector has a write enable bit for each FIFO entry in FIFO memory 402, and the bit corresponding to the FIFO entry being written is asserted to write to that FIFO entry. Hence, the write enable vector can be used as a selection signal to provide the write data to the FIFO entry being written. The write enable bit from the write enable vector can be considered as a write enable signal for the corresponding FIFO entry.

As mentioned above, the write pointer can be incremented so long as FIFO memory 402 is not full. To keep track of how full the FIFO memory 402 is, a write-side valid vector 424 operating in the write clock domain can be used to indicate which FIFO entry contains written data that has not yet been read. The write-side valid vector 424 contains a valid bit for each FIFO entry of FIFO memory 402. The valid bit for a FIFO entry can be set by the write enable signal from the write enable vector corresponding to the FIFO entry indicating that the FIFO entry is being written. The valid bit for a FIFO entry can be cleared by a synchronized read enable signal from the synchronized read enable vector (sync_rd_en_vector) corresponding to the FIFO entry indicating that the FIFO entry is being read. The read enable signal being used to clear the valid bit is synchronized to the write clock domain because the read enable vector is generated on the read side in the read clock domain. The write-side valid vector 424 can be provided to FIFO full logic 426 to generate a FIFO full status signal. The write-side valid vector 424 can also be provided to write pointer generator 422 to indicate the status of each FIFO entry as to whether the FIFO entry can be written.

FIFO full logic 426 operating in the write clock domain can generate a FIFO full status signal based on the write-side valid vector 424. For example, if all valid bits in the write-side valid vector 424 are set, FIFO full logic 426 can assert the FIFO full status signal to indicate to the FIFO writer that no further writes can be accepted at this point. The FIFO writer can restart issuing new write transactions when the FIFO full status is deasserted. In some implementations, FIFO full logic 426 can also generate a FIFO almost full status signal when a threshold number of valid bits (e.g., 90% of valid bits) in write-side valid vector 424 are set to indicate that FIFO memory is almost full. The FIFO almost full status signal can be used, for example, to halt the component that is writing FIFO memory 402 from issuing new write transactions, and to allow any pending write transactions to finish. New write transactions can resume when the FIFO fill level drops back down below the threshold and FIFO almost full status signal is deasserted.

On the read clock domain side, a read pointer generator 432 can generate the read pointer by starting with an initial value that points to the initial FIFO entry. The read pointer can be incremented to point to the next filled FIFO entry for each read operation issued by the FIFO reader, so long as the FIFO is not empty. Read pointer generator 432 can rollover the read pointer back to the initial FIFO entry when incrementing the read pointer from the last FIFO entry. In some implementations, similar to the write pointer, the read pointer generator 432 can generate a one-hot read enable vector (rd_en_vector) based on the read pointer. The read enable vector has a read enable bit for each FIFO entry in FIFO memory 402, and the bit corresponding to the FIFO entry being read is asserted to read from that FIFO entry. Hence, the read enable vector can be used as a selection signal to select the data from the FIFO entry being read. The read enable bit from the read enable vector can be considered as a read enable signal for the corresponding FIFO entry.

To keep track of whether the FIFO memory 402 is empty, a read-side valid vector 434 operating in the read clock domain can be used to indicate which FIFO entry contains written data that has not yet been read. The read-side valid vector 434 contains a valid bit for each FIFO entry of FIFO memory 402. The valid bit for a FIFO entry can be set by the synchronized write enable signal from the synchronized write enable vector (sync_wr_en_vector) corresponding to the FIFO entry indicating that the FIFO entry is being written. The write enable signal being used to set the valid bit is synchronized to the read clock domain because the write enable vector is generated on the write side in the write clock domain. The valid bit for a FIFO entry can be cleared by a read enable signal from the read enable vector corresponding to the FIFO entry indicating that the FIFO entry is being read. The read-side valid vector 434 can be provided to FIFO empty logic 436 to generate a FIFO empty status signal. The read-side valid vector 434 can also be provided to read pointer generator 432 to indicate the status of each FIFO entry as to whether the FIFO entry has valid data for reading.

FIFO empty logic 436 operating in the read clock domain can generate a FIFO empty status signal based on the read-side valid vector 434. For example, if all valid bits in the read-side valid vector 424 are cleared, FIFO empty logic 436 can assert the FIFO empty status signal to indicate to the FIFO reader that no further data can be read from FIFO memory 403 at this point. The FIFO reader can restart issuing read transactions when the FIFO empty status signal is deasserted.

To synchronize the write enable vector and the read enable vector, integrated circuit device 400 may include a synchronizer block 410. Synchronizer block 400 may contain a pair of synchronizer circuits for each FIFO entry in FIFO memory 402. For example, if FIFO memory 402 has 128 FIFO entries, synchronizer block 400 may include 128 pair of synchronizer circuits. Each pair of synchronizer circuits may include a write enable synchronizer circuit to generate a synchronized write enable signal in the read clock domain from the write enable signal in the write clock domain for the corresponding FIFO entry, and a read enable synchronizer circuit to generate a synchronized read enable signal in the write clock domain from the read enable signal in the read clock domain for the corresponding FIFO entry. The synchronized write enable signal of each FIFO entry collectively corresponds to the synchronized write enable vector (sync_wr_en_vector), and the synchronized read enable signal of each FIFO entry collectively corresponds to the synchronized read enable vector (sync_rd_en_vector).

Each of the write enable synchronizer circuit can have a similar structure as integrated circuit 100. Hence, a write enable synchronizer circuit may include a first stage flip-flop and a second stage flip-flop. The first stage flip-flop can be clocked by the write clock signal of the write clock domain, and the first stage input of the first stage flip-flop can be driven by a result of XOR-ing the write enable signal with the output of the first stage flip-flop. The second stage flip-flop can be clocked by the read clock signal of the read clock domain, and the second stage input of the second stage flip-flop can be driven by the output of the first stage flip-flop. The synchronized write enable signal can be generated by XOR-ing the output of the first stage flip-flop with the output of the second stage flip-flop.

Each of the read enable synchronizer circuit can also have a similar structure as integrated circuit 100. Hence, a read enable synchronizer circuit may include a first stage flip-flop and a second stage flip-flop. The first stage flip-flop can be clocked by the read clock signal of the read clock domain, and the first stage input of the first stage flip-flop can be driven by a result of XOR-ing the read enable signal with the output of the first stage flip-flop. The second stage flip-flop can be clocked by the write clock signal of the write clock domain, and the second stage input of the second stage flip-flop can be driven by the output of the first stage flip-flop. The synchronized read enable signal can be generated by XOR-ing the output of the first stage flip-flop with the output of the second stage flip-flop.

By utilizing the low-latency synchronizer circuit to synchronize the write enable and read enable signals, the FIFO empty status and the FIFO full status can be determined with minimal delay to keep the read and write pointers in synch. Given the up-to-date FIFO statuses, the data can be read directly from the FIFO entry as soon as the entry has been written as indicated by the read-side valid vector. Accordingly, the synchronizer circuit disclosed herein can be used to reduce the overall latency of a FIFO memory.

Figure 5:
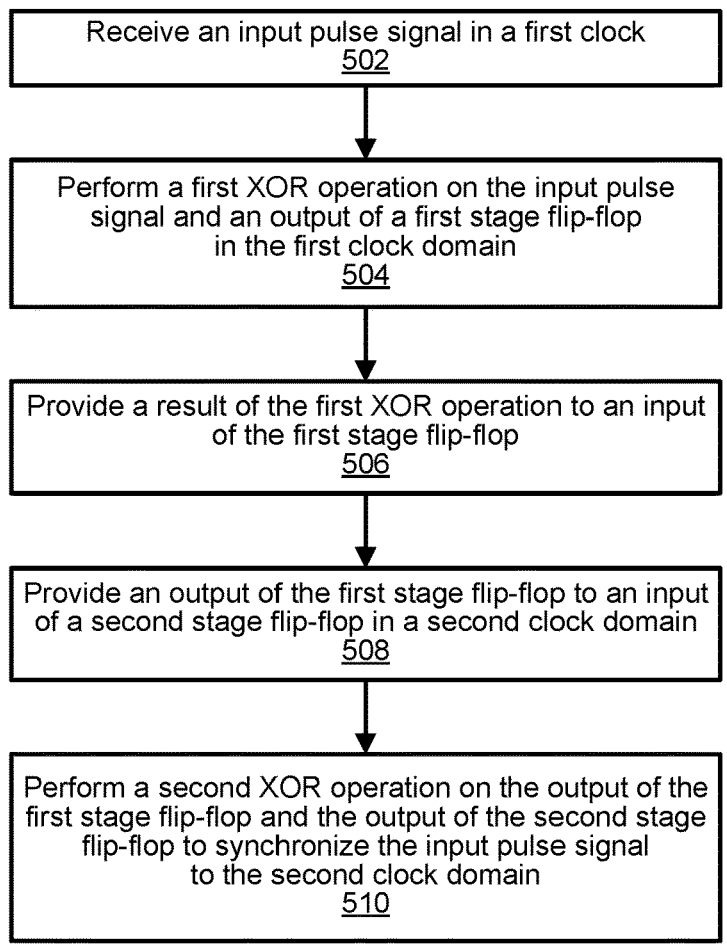
FIG. 5 illustrates a flow diagram of an example of a process for synchronizing a signal, according to certain aspects of the disclosure.

FIG. 5 illustrates a flow diagram of an example of a process 500 for synchronizing a pulse signal across clock domains. Process 500 can be performed, for instance, using a low-latency synchronizer circuit having a first stage flip-flop operating in a first clock domain (e.g., source clock domain) and a second stage flip-flop operating in a second clock domain (e.g., target clock domain). Process 500 may begin at block 502 by receiving an input pulse signal in the first clock domain (e.g., source clock domain). By way of example, in the context of a FIFO memory having different read and write clock domains, the input pulse signal can be a write enable signal in a write clock domain, or a read enable signal in a read clock domain.

At block 504, a first XOR operation is applied to the input pulse signal and an output of the first stage flip-flop operating in the first clock domain (e.g., source clock domain). The XOR operation can be implemented using a XOR logic gate, or other equivalent logic gates. At block 506, the result of the first XOR operation is provided to the input of the first stage flip-flop. At block 508, the output of the first stage flip-flop is provided to the input of the second stage flip-flop operating in the second clock domain (e.g., target clock domain).

At block 510, a second XOR operation is applied to the output of the first stage flip-flop and the output of the second stage flip-flop to synchronize the input pulse signal to the second clock domain. In some implementations, the synchronized signal can be a synchronized write enable signal to update the FIFO empty status operating in the read clock domain, or a synchronized read enable signal to update the FIFO full status operating in the write clock domain. In some implementations, process 500 may also include dynamically adjusting a scaling factor between the first clock domain and the second clock domain to change the clock frequency.

Figure 6:
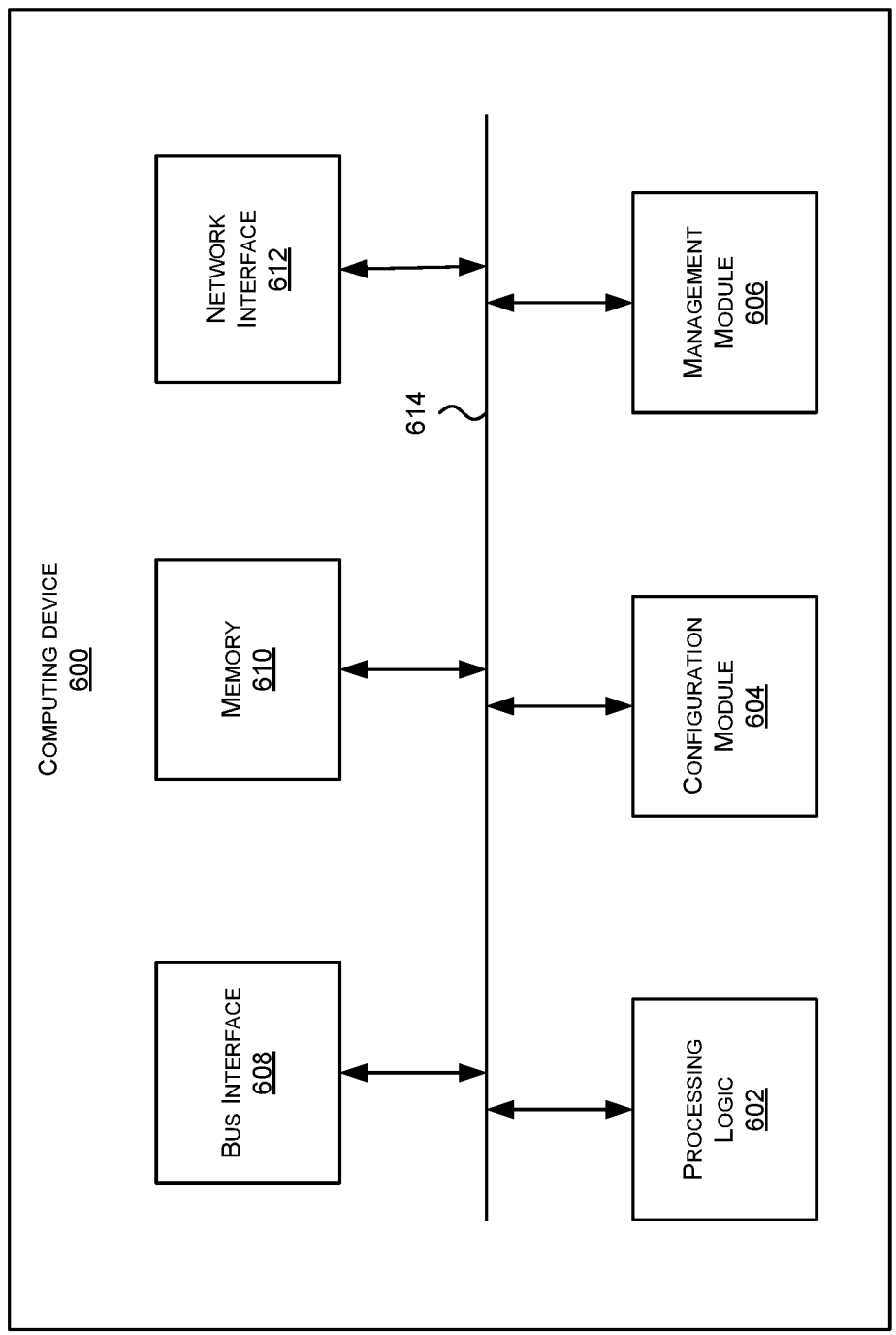
FIG. 6 illustrates an example of a computing device, according to certain aspects of the disclosure.

FIG. 6 illustrates an example of a computing device 600. Functionality and/or several components of the computing device 600 may be used without limitation with other embodiments disclosed elsewhere in this disclosure, without limitations. For example, the computing device 600 can include integrated circuit devices that implement the synchronizer circuit described herein.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, not illustrated here. In some implementations, the computing device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory may also store and maintain several data structures and routing tables for facilitating the functionality of the computing device 600.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested herein, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit, comprising:
   an input operable to receive an input pulse signal from a first clock domain;
   an output operable to provide an output pulse signal in a second clock domain;
   a first flip-flop having a first stage input, a first clock input, and a first stage output, wherein the first clock input is driven by a first clock signal of the first clock domain, and the first stage input is driven by a result of XOR-ing the input pulse signal and the first stage output; and
   a second flip-flop having a second stage input, a second clock input, and a second stage output, wherein the second clock input is driven by a second clock signal of the second clock domain, and the second stage input is driven by the first stage output,
   wherein the output pulse signal is generated by XOR-ing the second stage output with the first stage output, and
   wherein the first clock signal has a first frequency that is obtained by applying a scaling factor to a second frequency of the second clock signal, and the first clock signal and the second clock signal are based on a same clock source.

2. The integrated circuit of claim 1, wherein the first frequency is higher than the second frequency.

3. The integrated circuit of claim 2, wherein the scaling factor is $2^N$, N being an integer.

4. The integrated circuit of claim 1, wherein the second frequency is higher than the first frequency.

5. The integrated circuit of claim 2, wherein the scaling factor is $1/2^N$, N being an integer.

6. The integrated circuit of claim 1, wherein the scaling factor is dynamically adjustable.

7. The integrated circuit of claim 1, wherein the input pulse signal is a write enable signal in a write clock domain of a first-in-first-out (FIFO) memory, and the output pulse signal is a synchronized write enable signal in a read clock domain of the FIFO memory.

8. The integrated circuit of claim 7, wherein the FIFO memory has a FIFO empty status that is determined from the synchronized write enable signal and a read enable signal of the FIFO memory.

9. The integrated circuit of claim 1, wherein the input pulse signal is a read enable signal in a read clock domain of a first-in-first-out (FIFO) memory, and the output pulse signal is a synchronized read enable signal in a write clock domain of the FIFO memory.

10. The integrated circuit of claim 9, wherein the FIFO memory has a FIFO full status that is determined from the synchronized read enable signal and a write enable signal of the FIFO memory.

11. The integrated circuit of claim 1, wherein a clock-gate divider is used to generate the first clock signal from the second clock signal, or to generate the second clock signal from the first clock signal.

12. The integrated circuit of claim 8, wherein the FIFO empty status is generated from a read-side valid vector containing a valid bit for each FIFO entry in the FIFO memory, wherein the valid bit of a FIFO entry is set by the synchronized write enable signal and cleared by the read enable signal.

13. The integrated circuit of claim 10, wherein the FIFO full status is generated from a write-side valid vector containing a valid bit for each FIFO entry in the FIFO memory, wherein the valid bit of a FIFO entry is set by the write enable signal and cleared by the synchronized read enable signal.

14. The integrated circuit of claim 1, wherein the second frequency of the second clock signal is dynamically adjustable.

15. A method, comprising:
receiving an input pulse signal in a first clock domain;
performing a first XOR operation on the input pulse signal and an output of a first stage flip-flop in the first clock domain;
providing a result of the first XOR operation to an input of the first stage flip-flop;
providing an output of the first stage flip-flop to an input of a second stage flip-flop in a second clock domain; and
performing a second XOR operation on the output of the first stage flip-flop and an output of the second stage flip-flop to synchronize the input pulse signal to the second clock domain.

16. The method of claim 15, further comprising:
dynamically adjusting a scaling factor between the first clock domain and the second clock domain.

17. The method of claim 15, wherein the input pulse signal is a write enable signal in a write clock domain of a first-in-first-out (FIFO) entry of a FIFO memory.

18. The method of claim 15, wherein the input pulse signal is a read enable signal in a read clock domain of a first-in-first-out (FIFO) entry of a FIFO memory.

19. The method of claim 17, wherein the write enable signal is synchronized into a synchronized write enable signal in a read clock domain.

20. The method of claim 19, further comprising:
setting a read-side valid bit of the FIFO entry with the synchronized write enable signal; and
clearing the read-side valid bit of the FIFO entry with a read enable signal of the FIFO entry.

21. The method of claim 18, wherein the read enable signal is synchronized into a synchronized read enable signal in a write clock domain.

22. The method of claim 21, further comprising:
setting a write-side valid bit of the FIFO entry with a write enable signal of the FIFO entry; and
clearing the write-side valid bit of the FIFO entry with the synchronized read enable signal of the FIFO entry.

\* \* \* \* \*